US006947797B2

(12) United States Patent
Dean et al.

(10) Patent No.: US 6,947,797 B2
(45) Date of Patent: Sep. 20, 2005

(54) METHOD AND SYSTEM FOR DIAGNOSING MACHINE MALFUNCTIONS

(75) Inventors: Jason Arthur Dean, Erie, PA (US); Nicholas Edward Roddy, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 10/202,217

(22) Filed: Jul. 24, 2002

(65) Prior Publication Data

US 2002/0183866 A1 Dec. 5, 2002

Related U.S. Application Data

(63) Continuation-in-part of application No. 09/688,105, filed on Oct. 13, 2000, now Pat. No. 6,636,771, and a continuation-in-part of application No. 09/285,611, filed on Apr. 2, 1999, now Pat. No. 6,343,236.
(60) Provisional application No. 60/162,045, filed on Oct. 28, 1999.

(51) Int. Cl.$^7$ ................................................. G05B 9/02
(52) U.S. Cl. ............................ 700/79; 700/21; 700/26; 700/78; 700/81; 700/110; 700/177; 706/911; 706/912; 706/913; 706/914; 706/915; 706/916; 706/917; 706/918; 706/47; 706/50; 714/25; 714/26; 714/37; 714/39; 714/45; 701/29; 701/35; 702/182; 702/183; 702/184; 702/185; 702/186; 707/104.1
(58) Field of Search ................................. 702/182–186; 706/911–918, 47, 50; 700/21, 78, 79, 110, 177, 26, 81; 701/29, 35; 707/104.1; 714/25, 26, 37, 39, 45

(56) References Cited

U.S. PATENT DOCUMENTS

| 3,805,038 A | 4/1974 | Buedel et al. |
| 4,062,061 A | 12/1977 | Batchelor et al. |
| 4,270,174 A | 5/1981 | Karlin et al. |

(Continued)

OTHER PUBLICATIONS

Data–Tronic Gas Turbine Information And Control System; General Electric Gas Turbine Reference Library; 8 pgs.
Varma, Anil. ICARUS: Design and Development of a Case-Based Reasoning System for Locomotive Diagnostics. Springer–Verlag, 1999.

*Primary Examiner*—Anthony Knight
*Assistant Examiner*—Douglas Shute
(74) *Attorney, Agent, or Firm*—Carl Rowold; David G. Maire; Beusse Brownlee Wolter Mora & Maire, P.A.

(57) ABSTRACT

A system (830) and method (800) for diagnosing a malfunctioning machine. A fault event is selected (806) together with sequential operating parameter data (808) from a selectively focused time interval about the fault event for evaluation of a machine (810). The selectively focused time interval may include data occurring just before, just after, or spanning the fault event. Characterizing information such as slope, rate of change, and absolute sign of the data may be derived (809) from the operating parameter data over the selectively focused time interval and used in the diagnosis. The fault event and operating parameter data may be compared to existing cases in a case database (834). A set of rules (817) or candidate anomalies (841) may be executed over the operating parameter data to further improve the accuracy of the diagnosis.

23 Claims, 15 Drawing Sheets

U.S. PATENT DOCUMENTS

| | | | | |
|---|---|---|---|---|
| 4,322,813 A | | 3/1982 | Howard et al. | |
| 4,463,418 A | | 7/1984 | O'Quin, II et al. | |
| 4,517,468 A | | 5/1985 | Kemper et al. | |
| 4,521,847 A | | 6/1985 | Ziehm et al. | |
| 4,695,946 A | | 9/1987 | Andreasen et al. | |
| 4,823,914 A | | 4/1989 | McKinney et al. | |
| 4,970,725 A | | 11/1990 | McEnroe et al. | |
| 4,977,390 A | | 12/1990 | Saylor et al. | |
| 5,023,817 A | | 6/1991 | Au et al. | |
| 5,113,489 A | | 5/1992 | Cihiwsky et al. | |
| 5,123,017 A | | 6/1992 | Simpkins et al. | |
| 5,127,005 A | | 6/1992 | Oda et al. | |
| 5,157,610 A | | 10/1992 | Asano et al. | |
| 5,216,621 A | * | 6/1993 | Dickens | 702/58 |
| 5,224,206 A | * | 6/1993 | Simoudis | 706/61 |
| 5,274,572 A | | 12/1993 | O'Neill et al. | |
| 5,282,127 A | | 1/1994 | Mii | |
| 5,287,505 A | | 2/1994 | Calvert et al. | |
| 5,313,388 A | * | 5/1994 | Cortis | 701/35 |
| 5,321,837 A | | 6/1994 | Daniel et al. | |
| 5,329,465 A | | 7/1994 | Arcella et al. | |
| 5,400,018 A | | 3/1995 | Scholl et al. | |
| 5,406,502 A | | 4/1995 | Haramaty et al. | |
| 5,445,347 A | | 8/1995 | Ng | |
| 5,463,768 A | | 10/1995 | Cuddihy et al. | |
| 5,508,941 A | | 4/1996 | Leplingard et al. | |
| 5,515,297 A | * | 5/1996 | Bunting | 702/183 |
| 5,528,516 A | | 6/1996 | Yemini et al. | |
| 5,566,091 A | | 10/1996 | Schricker et al. | |
| 5,594,663 A | | 1/1997 | Messaros et al. | |
| 5,596,712 A | | 1/1997 | Tsuyama et al. | |
| 5,633,628 A | | 5/1997 | Denny et al. | |
| 5,638,296 A | | 6/1997 | Johnson et al. | |
| 5,661,668 A | | 8/1997 | Yemini et al. | |
| 5,666,481 A | | 9/1997 | Lewis | |
| 5,666,534 A | | 9/1997 | Gilbert et al. | |
| 5,678,002 A | | 10/1997 | Fawcett et al. | |
| 5,680,541 A | | 10/1997 | Kurosu et al. | |
| 5,729,452 A | | 3/1998 | Smith et al. | |
| 5,742,915 A | | 4/1998 | Stafford | |
| 5,761,092 A | * | 6/1998 | Bunting | 702/185 |
| 5,774,645 A | | 6/1998 | Beaujard et al. | |
| 5,790,780 A | | 8/1998 | Brichta et al. | |
| 5,799,148 A | | 8/1998 | Cuddihy et al. | |
| 5,815,071 A | | 9/1998 | Doyle | |
| 5,835,871 A | | 11/1998 | Smith et al. | |
| 5,845,272 A | | 12/1998 | Morjaria et al. | |
| 5,862,316 A | | 1/1999 | Hagersten et al. | |
| 5,928,369 A | | 7/1999 | Keyser et al. | |
| 5,950,147 A | | 9/1999 | Sarangapani et al. | |
| 5,956,664 A | | 9/1999 | Bryan | |
| 6,052,631 A | | 4/2000 | Busch et al. | |
| 6,073,089 A | * | 6/2000 | Baker et al. | 702/185 |
| 6,078,851 A | | 6/2000 | Sugitani | |
| 6,144,901 A | | 11/2000 | Nickles et al. | |
| 6,175,934 B1 | | 1/2001 | Hershey et al. | |
| 6,216,066 B1 | | 4/2001 | Goebel et al. | |
| 6,243,628 B1 | | 6/2001 | Bliley et al. | |
| 6,263,265 B1 | | 7/2001 | Fera | |
| 6,301,531 B1 | | 10/2001 | Pierro et al. | |
| 6,324,659 B1 | | 11/2001 | Pierro | |
| 6,336,065 B1 | | 1/2002 | Gibson et al. | |
| 6,338,152 B1 | | 1/2002 | Fera et al. | |
| 6,343,236 B1 | | 1/2002 | Gibson et al. | |
| 6,405,108 B1 | | 6/2002 | Patel et al. | |
| 6,415,395 B1 | | 7/2002 | Varma et al. | |

* cited by examiner

EXEMPLARY DATAFIELDS ASSOCIATED WITH ANOMALY
DEFINITIONS BASED ON CONTINUOUS PARAMETER DATA

GENERAL INFORMATION:

ANOMALY DEFINITION ID ☐

OBJECTIVE:

EXPLANATION:

MESSAGE TO BE GENERATED:

OWNER: D8 ☐ D9 ☒ AC4400 ☒ ACCONV ☒ AC6000 ☐

LOCOMOTIVE MODEL(S):

LOCOMOTIVE CONFIGURATION:

STATUS (DATE): DEVELOPEMENT [mm/dd/yy] IN REVIEW [mm/dd/yy] APPROVED [mm/dd/yy]

LOCOMOTIVE OPERATING CONDITIONS:

54

|  |  | STATISTICS | TRENDS |
|---|---|---|---|
| LOCOMOTIVE SPEED: | ☐ < MPH < ☐ | ☐ | ☐ |
| ENGINE RPM: | ☐ < MPH < ☐ | ☐ | ☐ |
| GROSS HP: | ☐ < MPH < ☐ | ☐ | ☐ |
| NOTCH CALL: | ☐ | | |
| MAX. NOTCH ALLOWED: | ☐ | | |
| OPERATING MODE: | DYNAMIC BRAKE ☐   MOTORING ☐   SELF-LOAD ☐ | | |

MONITORED PARAMETERS & SENSORS:

56

| NAME | NUMBER | LOWER LIMIT | | UPPER LIMIT | STATISTICS | TRENDS |
|---|---|---|---|---|---|---|
| PARAM1 | ☐ | ☐ | < PARAM1 < | ☐ | ☐ | ☐ |
| PARAM2 | ☐ | ☐ | < PARAM2 < | ☐ | ☐ | ☐ |
| PARAM3 | ☐ | ☐ | < PARAM3 < | ☐ | ☐ | ☐ |
| PARAM4 | ☐ | ☐ | < PARAM4 < | ☐ | ☐ | ☐ |

| 7311 | 24 |
|------|----|
| 728F | 2  |
| 76D5 | 1  |
| 720F | 1  |

Fig. 5A

| 7311 |
|------|
| 728F |
| 76D5 |
| 720F |

Fig. 5B

| 76D5 | 7311 |
|------|------|
| 76D5 | 728F |
| 76D5 | 720F |
| 7311 | 728F |
| 7311 | 720F |
| 728F | 720F |

Fig. 5C

| 76D5 | 7311 | 728F |
|------|------|------|
| 76D5 | 7311 | 720F |
| 76D5 | 728F | 720F |
| 7311 | 728F | 720F |

Fig. 5D

| 76D5 | 7311 | 728F | 720F |
|------|------|------|------|

250 ↘

| 252 | 253 | | 254 | | | 253 | 255 | | |
|---|---|---|---|---|---|---|---|---|---|
| ENTERED | 1777 | WITH | 0.850 | BASED | ON | 1777 | 7311 | 728F | 720F |
| ENTERED | 1766 | WITH | 0.850 | BASED | ON | 1766 | 7311 | 728F | 720F |
| ENTERED | 1715 | WITH | 0.364 | BASED | ON | 1715 | 76D5 | 7311 | |
| ENTERED | 1677 | WITH | 0.300 | BASED | ON | 1677 | 7311 | 720F | |
| STORING | 1777 | WITH | 0.300 | BASED | ON | 1777 | 7311 | 720F | |
| STORING | 1766 | WITH | 0.300 | BASED | ON | 1766 | 7311 | 720F | |
| STORING | 1777 | WITH | 0.300 | BASED | ON | 1777 | 7311 | 728F | |
| STORING | 1677 | WITH | 0.300 | BASED | ON | 1677 | 7311 | 728F | |
| STORING | 1766 | WITH | 0.300 | BASED | ON | 1766 | 7311 | 728F | |
| ENTERED | 1745 | WITH | 0.280 | BASED | ON | 1745 | 76D5 | 728F | 720F |
| ENTERED | 2323 | WITH | 0.273 | BASED | ON | 2323 | 76D5 | 7311 | |
| STORING | 1677 | WITH | 0.273 | BASED | ON | 1677 | 76D5 | 7311 | |
| STORING | 1715 | WITH | 0.211 | BASED | ON | 1715 | 7311 | | |
| STORING | 1745 | WITH | 0.200 | BASED | ON | 1745 | 76D5 | 728F | |
| STORING | 1745 | WITH | 0.184 | BASED | ON | 1745 | 76D5 | 720F | |
| STORING | 2323 | WITH | 0.160 | BASED | ON | 2323 | 76D5 | | |
| STORING | 1677 | WITH | 0.158 | BASED | ON | 1677 | 7311 | | |
| STORING | 1777 | WITH | 0.158 | BASED | ON | 1777 | 7311 | | |
| STORING | 1766 | WITH | 0.158 | BASED | ON | 1766 | 7311 | | |
| STORING | 2323 | WITH | 0.158 | BASED | ON | 2323 | 7311 | | |
| STORING | 1745 | WITH | 0.148 | BASED | ON | 1745 | 728F | 720F | |
| ENTERED | 1869 | WITH | 0.143 | BASED | ON | 1869 | 7311 | 728F | 720F |
| STORING | 1745 | WITH | 0.130 | BASED | ON | 1745 | 728F | | |
| ENTERED | 2142 | WITH | 0.130 | BASED | ON | 2142 | 728F | 720F | |
| STORING | 1869 | WITH | 0.120 | BASED | ON | 1869 | 76D5 | 728F | 720F |
| ENTERED | 1814 | WITH | 0.105 | BASED | ON | 1814 | 7311 | | |
| STORING | 2142 | WITH | 0.103 | BASED | ON | 2142 | 720F | | |
| STORING | 2142 | WITH | 0.101 | BASED | ON | 2142 | 728F | | |

260 ↘ NUMBER OF DISTINCT ANOMALY DEFINITION
IN CURRENT CASE IS: 4

| 1766- | EFI | MATCHES | 0.850 | |
|---|---|---|---|---|
| 1777- | PRESSURE PUMP | MATCHES | 0.850 | |
| 1677- | TRACTION PROBLEM | MATCHES | 1.031 | CASES:32 |
| 1745- | LOCOMOTIVE SOFTWARE PROBLEMS | MATCHES | 0.943 | CASES:39 |
| 2323- | ENGINE OVER HEATED | MATCHES | 0.591 | CASES:71 |

Fig. 8

| FAULT CODE | FAULT DESCRIPTION | TIME OF OCCURRENCE | RESET TIME | LOCOMOTIVE SPEED | ENGINE SPEED | WATER TEMPERATURE |
|---|---|---|---|---|---|---|
| 1000 | WHEELSIDE | | | | | |
| XX | VARIOUS | | | | | |
| XX | ANY | SAME AS PREVIOUS | | | | |
| XX | ANY | SAME AS PREVIOUS TWO FAULTS | | | | |
| XX | ANY | | | | | WATER TEMP IS T₁ DEG. HIGHER THAN OIL TEMP. & WATER TEMP. IS OVER T₂ DEG. |
| XX | ANY | | | | | |

Fig. 14A

| OIL TEMP | CALL | PROBLEM/ ACTION | REPAIR CODE | FILTER/ CSA | COMMENT |
|---|---|---|---|---|---|
|  |  | HANDBRAKE | 200 | CSA | HANDBRAKE ON |
| 854 { | S | IGNORE FAULT |  | F | S INDICATES SELF-TEST |
|  |  | IGNORE DATAPACK | 201 | F | Fn LOGGED IN SAME PRE-DETERMINE INTERVAL PREVIOUS FAULTS Fn |
|  |  | IGNORE DATAPACK | 202 | F | Fn LOGGED IN SAME PRE-DETERMINE INTERVAL PREVIOUS FAULTS Fn |
|  |  | COOLING SYSTEM MALFUNCTION | 203 | CSA |  |
|  |  | LUBRICATION MALFUNCTION | 204 | CSA |  |

862 { OIL TEMP IS $T_1$ DEG. HIGHER THAN WATER TEMP. & OIL TEMP. IS OVER $T_2$ DEG.

~850

Fig. 14B

METHOD AND SYSTEM FOR DIAGNOSING MACHINE MALFUNCTIONS

This application is continuation-in-part of U.S. patent application Ser. No. 09/688,105, filed Oct. 13, 2000, now U.S. Pat. No. 6,636,771 dated Oct. 21, 2003, which, in turn, claims benefit of United States provisional patent application number 60/162,045 filed Oct. 28, 1999, and further is a continuation-in-part of U.S. patent application Ser. No. 09/285,611, filed Apr. 2, 1999, now U.S. Pat. No. 6,343,236 dated Jan. 29, 2002.

FIELD OF THE INVENTION

This invention relates generally to machine diagnostics, and more specifically to a system and method for processing fault log data and operating parameter data for analyzing a malfunctioning machine and for making repair recommendations for the machine.

BACKGROUND OF THE INVENTION

A machine such as locomotive includes elaborate controls and sensors that generate faults when anomalous operating conditions of the locomotive are encountered. Typically, a field engineer will look at a fault log and determine whether a repair is necessary.

Approaches like neural networks and decision trees have been employed to learn from historical data to provide prediction, classification, and function approximation capabilities in the context of diagnostics. Such approaches often require structured and relatively static and complete input data sets for learning, and they have produced models that resist real-world interpretation.

Case Based Reasoning (CBR) is based upon the observation that experiential knowledge (memory of past experiences—or cases) is applicable to problem solving as learning rules or behaviors. CBR relies on relatively little preprocessing of raw knowledge, focusing instead on indexing, retrieval, reuse, and archival of cases. In the diagnostic context, a case generally refers to a problem/solution pair that represents a diagnosis of a problem and an appropriate repair. CBR assumes cases described by a fixed, known number of descriptive attributes. Conventional CBR systems assume a corpus of fully valid "gold standard" cases that can be matched against new incoming cases.

U.S. Pat. No. 5,463,768 discloses an approach that uses error log data and assumes predefined cases with each case associating an input error log to a verified, unique diagnosis of a problem. In particular, historical error logs are grouped into case sets of common malfunctions. From the group of case sets, common patters, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. Pat. No. 6,343,236 discloses a system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. patent application Ser. No. 09/285,612, assigned to the same assignee of the present invention, discloses a system and method for analyzing new fault log data from a malfunctioning machine in which the system and method are not restricted to sequential occurrences of fault log entries, and wherein the system and method predict one or more repair actions using predetermined weighted repair and distinct fault cluster combinations. Additionally, U.S. Pat. No. 6,336,065 discloses a system and method that uses snapshot observations of operational parameters from the machine in combination with the fault log data in order to further enhance the predictive accuracy of the diagnostic algorithms used therein.

It is believed that the inventions disclosed in the foregoing documents provide substantial advantages and advancements in the art of diagnostics. However, as computing power continues to become faster and less expensive, it is desirable to develop further refinements in diagnostic techniques in order to further enhance the accuracy of the diagnosis of complicated machinery.

SUMMARY OF THE INVENTION

A method for diagnosing a malfunction of a machine is described herein as including: receiving sequential operating parameter data from a machine; receiving a fault indication from the machine; selecting sequential operating parameter data from a selectively focused time interval about the fault indication; and using the selected sequential operating parameter data and the fault indication to diagnose a malfunction of the machine. The method may further include: developing characterizing information from the sequential operating parameter data over the selectively focused time interval; and using the characterizing information and the fault indication to diagnose a malfunction of the machine. The method selected sequential operating parameter data and the fault indication may be used to construct a new case; and the new case compared to known cases in a case database to diagnose a malfunction of the machine. The selected sequential operating parameter data and the fault indication may be compared to a rule base to diagnose a malfunction of the machine. The sequential operating parameter data may be selected from a time interval sequentially prior to the fault indication, from a time interval spanning a time period of the fault indication, or from a time interval sequentially after the fault indication. Rate of change information may be developed from the selected sequential operating parameter data; and the rate of change information and the fault indication used to diagnose a malfunction of the machine. Absolute sign information, direction of change information or slope information may be developed from the selected sequential operating parameter data and used with the fault indication to diagnose a malfunction of the machine.

A method of diagnosing a malfunction of a mobile vehicle is described herein as including: recording sequential operating parameter data from the vehicle; receiving a fault indication from the vehicle; selecting sequential operating parameter data from a selectively focused time interval about the fault indication; and using the selected sequential operating parameter data and the fault indication to diagnose a malfunction of the vehicle.

An apparatus for diagnosing a malfunction of a machine is described herein as including; an operating parameter database containing sequential operating parameter data from a machine; a fault log database containing fault log data from the machine; a processor connected to the operating parameter database and the fault log database; programmed instructions executable by the processor to select a fault event; programmed instructions executable by the processor to select sequential operating parameter from a selectively focused time interval about the fault indication; and programmed instructions executable by the processor to use the selected sequential operating parameter data and the fault event to diagnose a malfunction of the machine. The apparatus may further include: programmed instructions executable by the processor to develop characterizing information from the selected sequential operating parameter data over the selectively focused time interval; and programmed instructions executable by the processor to use the characterizing information and the fault event to diagnose a malfunction of the machine.

BRIEF DESCRIPTION OF THE DRAWINGS

FIG. 4 is an illustration of distinct anomaly definitions identified in the new continuous parameter data, such as may be represented in FIG. 2, and the number of occurrences thereof;

FIGS. 5A–5D are illustrations of distinct fault anomaly definition clusters for the distinct faults identified in FIG. 4;

FIG. 8 is a printout of weighted repair and anomaly definition cluster combinations provided by the system shown in FIG. 1 for continuous parameter that may be represented in FIG. 2, and a listing of recommended repairs;

FIGS. 14A–14B are an illustration of exemplary hybrid data including fault log data and operational parameter data and further including noise reduction filters and candidate snapshot anomalies.

DETAILED DESCRIPTION OF THE INVENTION

Figure 1:
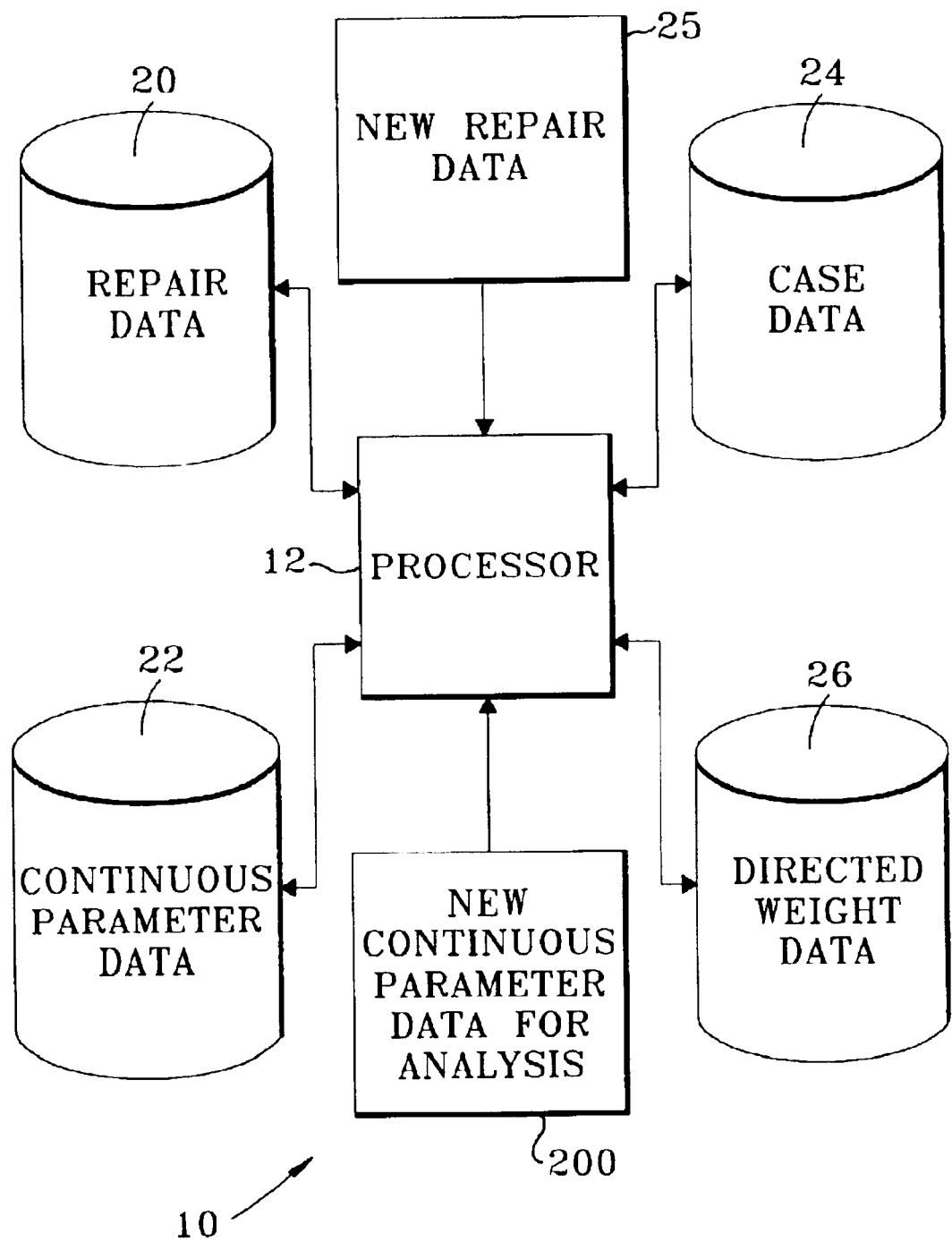
FIG. 1 is one embodiment of a block diagram of a system of the present invention for automatically processing repair data and continuous parameter data from one or more machines and diagnosing a malfunctioning machine.

FIG. 1 diagrammatically illustrates one exemplary embodiment of a system 10 of the present invention. In one aspect, system 10 provides automated analysis of continuous parameter data, from a malfunctioning machine such as a locomotive, and prediction of one or more possible repair actions.

Although the present invention is described with reference to a locomotive, system 10 can be used in conjunction with any machine in which operation of the machine is monitored, such as a chemical, an electronic, a mechanical, a microprocessor machine and any other land-based, self-powered transport equipment.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to a repair data storage unit 20, a continuous parameter data storage unit 22, a case data storage unit 24, and a directed weight data storage unit 26.

Figure 2A:
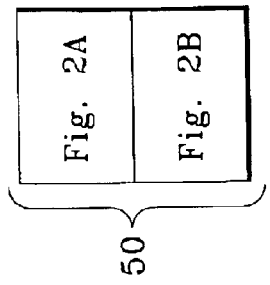
FIG. 2 is an illustration of an exemplary data structure including data fields that may be used for specifying an anomaly definition and including exemplary new continuous parameter data from a malfunctioning machine.

FIG. 2 shows an exemplary data structure 50 comprising a plurality of data fields, generally associated with anomaly definitions based on continuous parameter data. As shown in FIG. 2, a set of data fields 52 may include general information regarding each anomaly definition, such as anomaly definition identifier, objective, explanatory remarks, message to be automatically generated upon detection of a respective anomaly definition, personnel responsible for handling a respective anomaly definition, locomotive model and configuration, etc. As further shown in FIG. 2, a set of data fields 54 may include observations indicative of locomotive operating conditions that may be associated with an anomaly definition, including statistics data that may be extracted from such observations. FIG. 2 further shows a set of data fields 56 that may include continuous operational parameter data that may be associated with a given anomaly definition. For example, if parameter 1 is outside a predefined range, and the standard deviation of parameter 2 is beyond a predefined level, and parameter 3 exceeds a predefined rate of change, and parameter 4 is outside another predefined range under a given set of locomotive operating condition, then, assuming each of the above conditions is met, and further assuming that there is an anomaly definition specifying each of such conditions, that would constitute detection of such anomaly definition, that is, the occurrence of each of such events would trigger that anomaly definition. It will be appreciated that the level of information that can be obtained from anomaly definitions based on continuous parameter data comprising a selectable time window is more statistically robust compared to fault log data that are based on the occurrence of single instance events. The inventors of the present invention have advantageously recognized that diagnostics algorithm techniques typically associated with the processing of fault log data may now be extended to processing anomaly definitions based on continuous parameter data, as opposed to singular time events.

Figure 3:
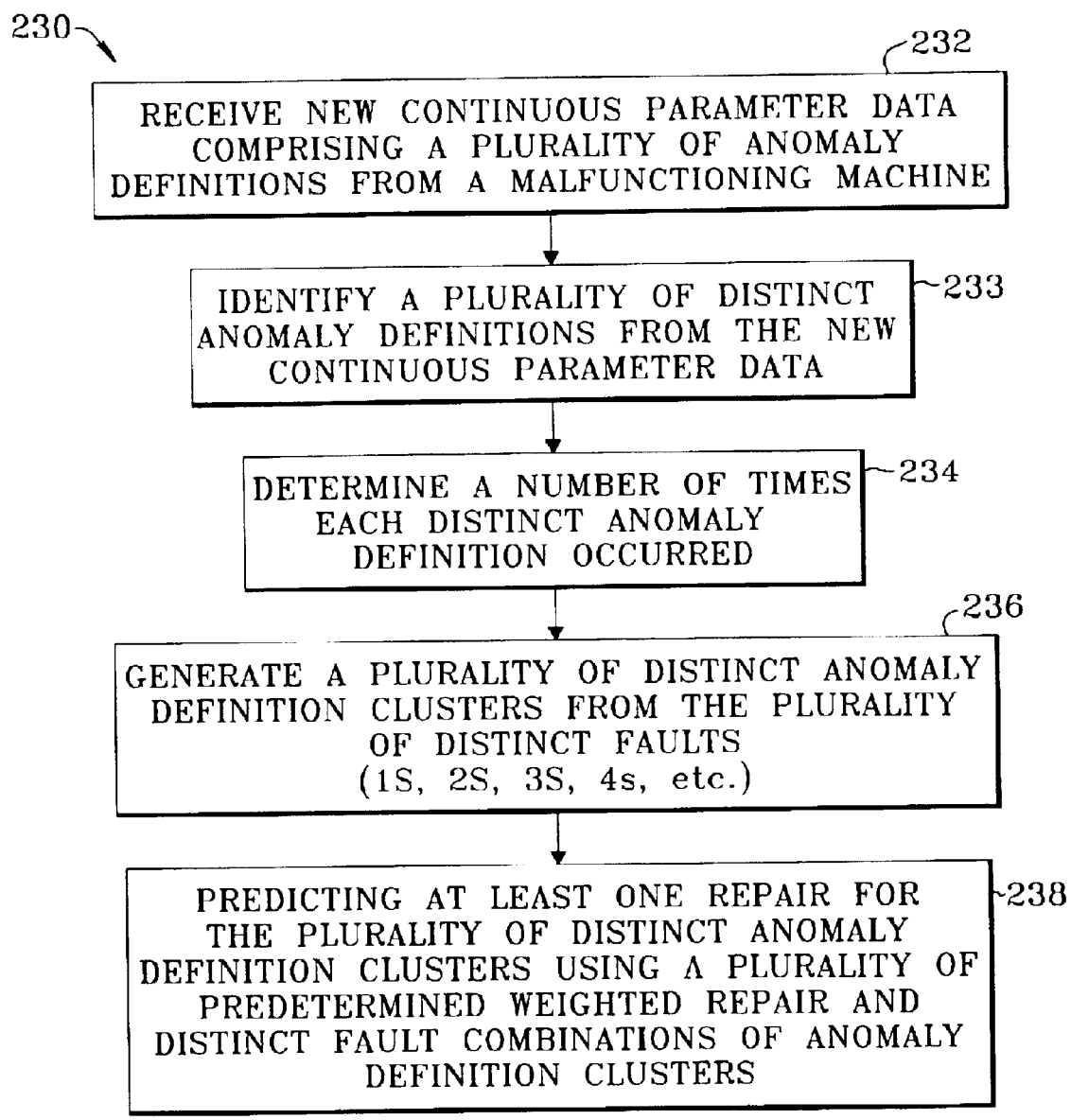
FIG. 3 is a flowchart describing the steps for analyzing the new continuous parameter data from a malfunctioning machine and predicting one or more possible repair actions.

FIG. 3 is a flowchart that generally describes the steps for analyzing new continuous parameter data 200 (FIG. 1). As shown in FIG. 3 at 232, the new continuous parameter data comprising a plurality of anomaly definitions from a malfunctioning machine is received. At 233, a plurality of distinct anomaly definitions from the new continuous parameter data is identified, and at 234, the number of times each distinct anomaly definition occurred in the new continuous parameter data is determined. As used herein, the term "distinct anomaly definition" is an anomaly definition or anomaly code which differs from other anomaly definitions or anomaly codes so that, as described in greater detail below, if the continuous parameter data includes more than one occurrence of the same anomaly definition or anomaly code, then similar anomaly definitions or anomaly codes are identified only once. As will become apparent from the discussion below, in one exemplary embodiment, it is the selection or triggering of distinct anomaly definitions which is important and not the order or sequence of their arrangement.

FIG. 4 shows an exemplary plurality of distinct anomaly definitions and the number of times in which each distinct anomaly definition occurred for continuous parameter 220 (FIG. 2). In this example, anomaly definition code 7311 represents a phase module malfunction which occurred 24 times, anomaly definition code 728F indicates an inverter propulsion malfunction which occurred twice, anomaly definition code 76D5 indicates an anomaly definition which occurred once, and anomaly definition code 720F indicates an inverter propulsion malfunction which occurred once.

With reference again to FIG. 3, a plurality of anomaly definition clusters is generated for the distinct anomaly definitions at 236. FIGS. 5A–5D illustrate the distinct anomaly definition clusters generated from the distinct anomaly definitions extracted from continuous parameter data 200. Four single anomaly definition clusters (e.g., anomaly definition code 7311, anomaly definition code 728F, anomaly definition code 76D5, and anomaly definition code 720F) are illustrated in FIG. 5A. Six double anomaly definition clusters (e.g., anomaly definition codes 76D5 and 7311, anomaly definition codes 76D5 and 728F, anomaly definition codes 76D5 and 720F, anomaly definition codes 7311 and 728F, anomaly definition codes 7311 and 720F, and anomaly definition codes 728F and 720F) are illustrated in FIG. 5B. Four triple anomaly definition clusters (e.g., anomaly definition codes 76D5, 7311, and 728F), anomaly definition codes 76D5, 7311, and 720F, anomaly definition codes 76D5, 728F, and 720F, and anomaly definition codes 7311, 728F, and 720F) are illustrated in FIG. 5C, and one quadruple anomaly definition cluster (e.g., 76D5, 7311, 728F, and 720F) is illustrated in FIG. 5D.

From the present description, it will be appreciated by those skilled in the art that an anomaly definition log having a greater number of distinct anomaly definitions would result in a greater number of distinct anomaly definition clusters (e.g., ones, twos, threes, fours, fives, etc.).

At 238, at least one repair is predicted for the plurality of anomaly definition clusters using a plurality of predetermined weighted repair and anomaly definition cluster combinations. The plurality of predetermined weighted repair and anomaly definition cluster combinations may be generated as follows.

With reference again to FIG. 1, processor 12 is desirably operable to process historical repair data contained in a repair data storage unit 20 and historical continuous parameter data contained in a continuous parameter data storage unit 22 regarding one or more locomotives.

For example, repair data storage unit 20 includes repair data or records regarding a plurality of related and unrelated repairs for one or more locomotives. Continuous parameter data storage unit 22 includes continuous parameter data or records regarding a plurality of anomaly definitions occurring for one or more locomotives.

Figure 6:
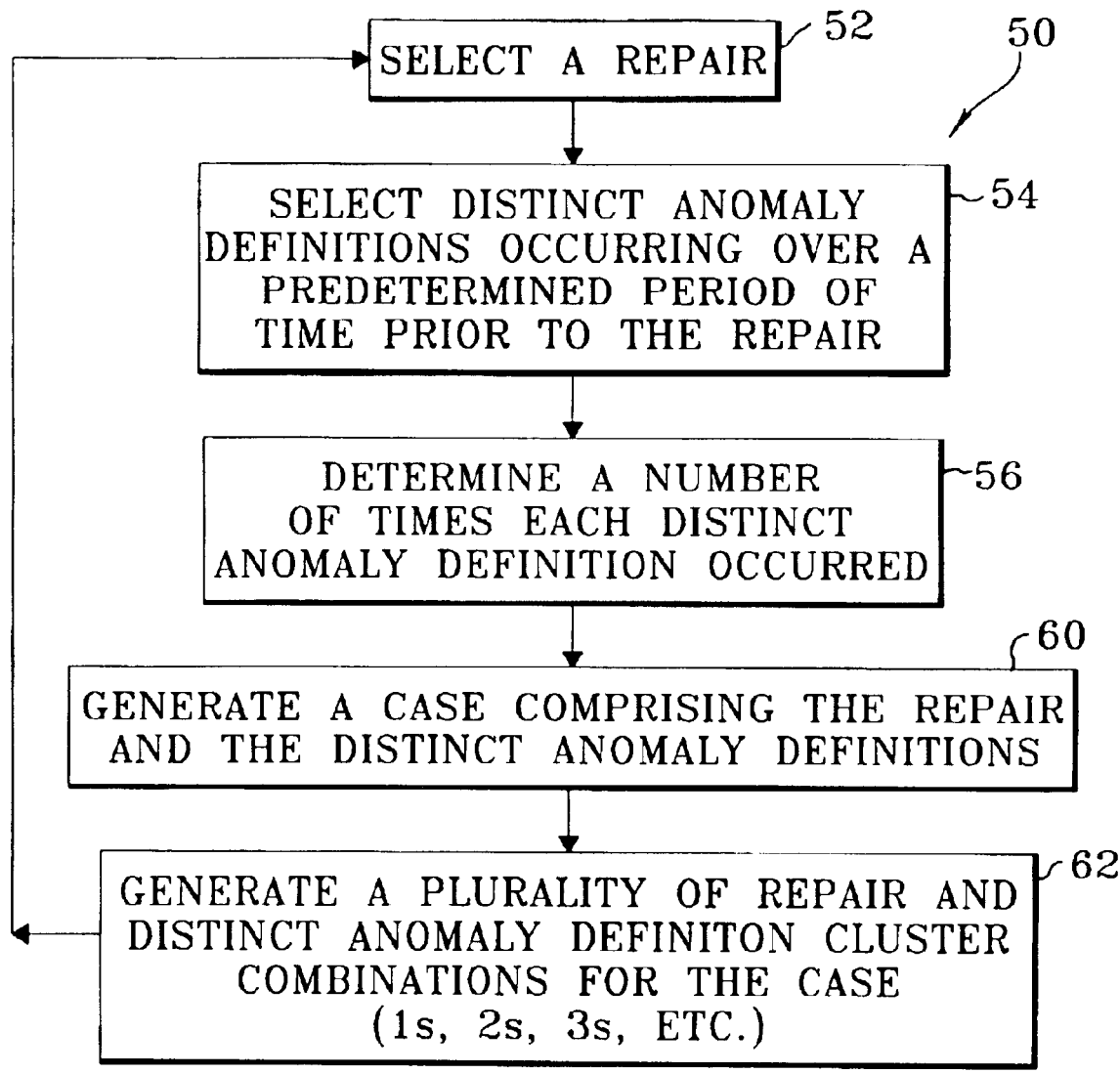
FIG. 6 is a flowchart describing the steps for generating a plurality of predetermined cases, and predetermined repair and anomaly definition cluster combinations for each case.

FIG. 6 is a flowchart of an exemplary process 50 of the present invention for selecting or extracting repair data from repair data storage unit 20 and continuous parameter data from the continuous parameter data storage unit 22 and generating a plurality of cases, and repair and anomaly definition cluster combinations.

Exemplary process 50 comprises, at 52, selecting or extracting a repair from repair data storage unit 20 (FIG. 1). Given the identification of a repair, the present invention searches continuous parameter data storage unit 22 (FIG. 1) to select or extract anomaly definitions occurring over a predetermined period of time prior to the repair, at 54. At 56, the number of times each distinct anomaly definition occurred during the period of time is determined.

A repair and corresponding distinct anomaly definitions are summarized and stored as a case, at 60. For each case, a plurality of repair and anomaly definition cluster combinations is generated at 62 (in a similar manner as described for the new continuous parameter data).

Process 50 is repeated by selecting another repair entry from repair data to generate another case, and to generate a plurality of repair and anomaly definition cluster combinations. Case data storage unit 24 desirably comprises a plurality of cases comprising related and unrelated repairs.

Figure 7:
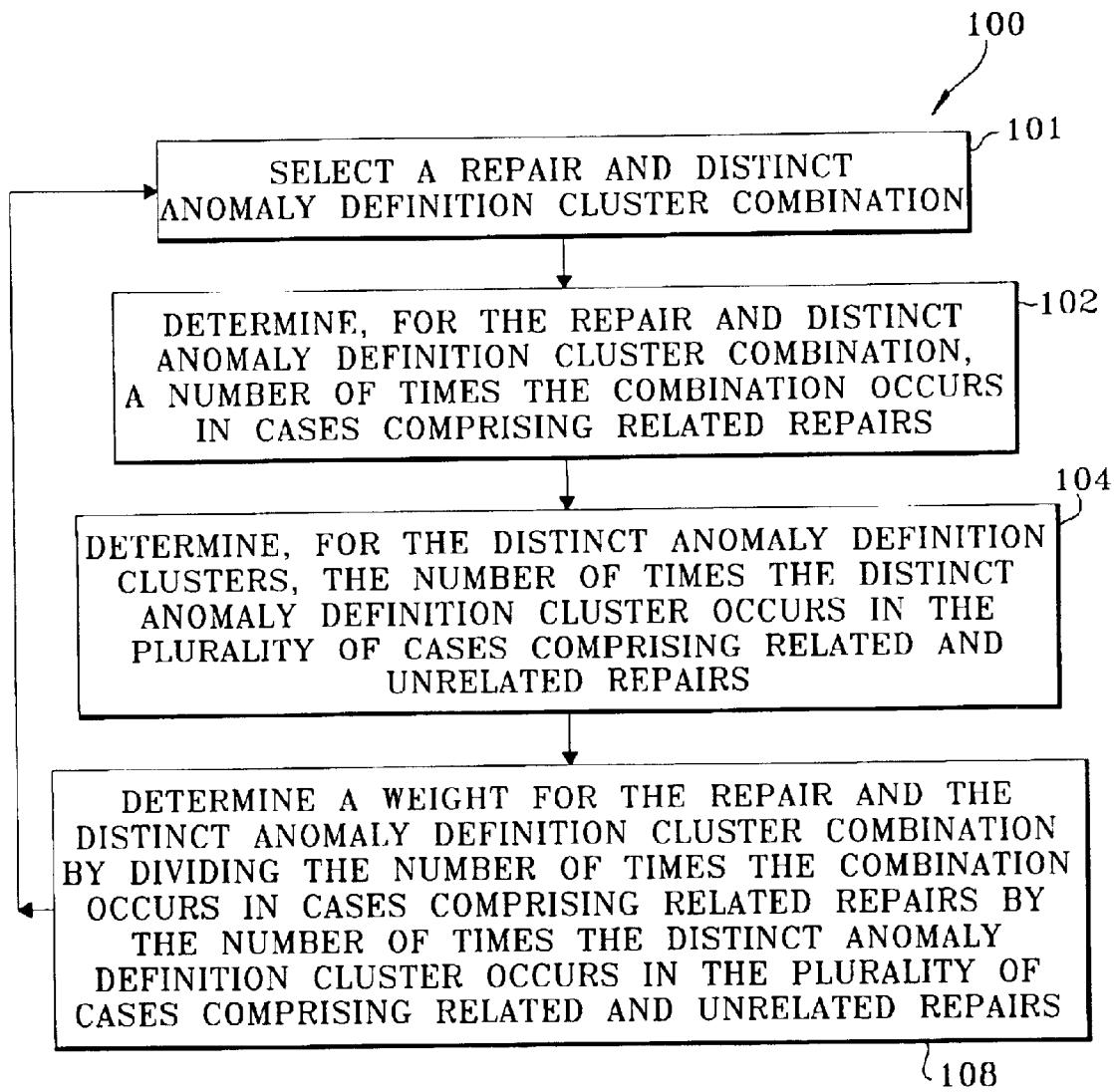
FIG. 7 is a flowchart describing the steps for determining predetermined weighted repair and anomaly definition cluster combinations.

FIG. 7 is a flowchart of an exemplary process 100 of the present invention for generating weighted repair and anomaly definition cluster combinations based on the plurality of cases generated in process 50. Process 100 comprises, at 101, selecting a repair and anomaly definition cluster combination, and determining, at 102, the number of times the combination occurs for related repairs. The number of times the combination occurs in the plurality of cases of related and unrelated repairs, e.g., all repairs for similar locomotives, is determined at 104. A weight is determined at 108 for the repair and distinct anomaly definition cluster combination by dividing the number of times the distinct anomaly definition cluster occurs in related cases by the number of times the distinct anomaly definition cluster occurs in all, e.g., related and unrelated cases, and the weighted repair and distinct anomaly definition cluster combination is desirably stored in a directed weight data storage unit 26.

FIG. 8 illustrates an exemplary printout 250 of the results generated by system 10 (FIG. 1) based on continuous parameter data 200 (FIG. 1), in which in a first portion 252, a plurality of corresponding repairs 253, assigned weights 254, and anomaly definition clusters 255 are presented. As shown in a second portion 260 of printout 250, five recommendations for likely repairs actions are presented for review by a field engineer.

Figure 9:
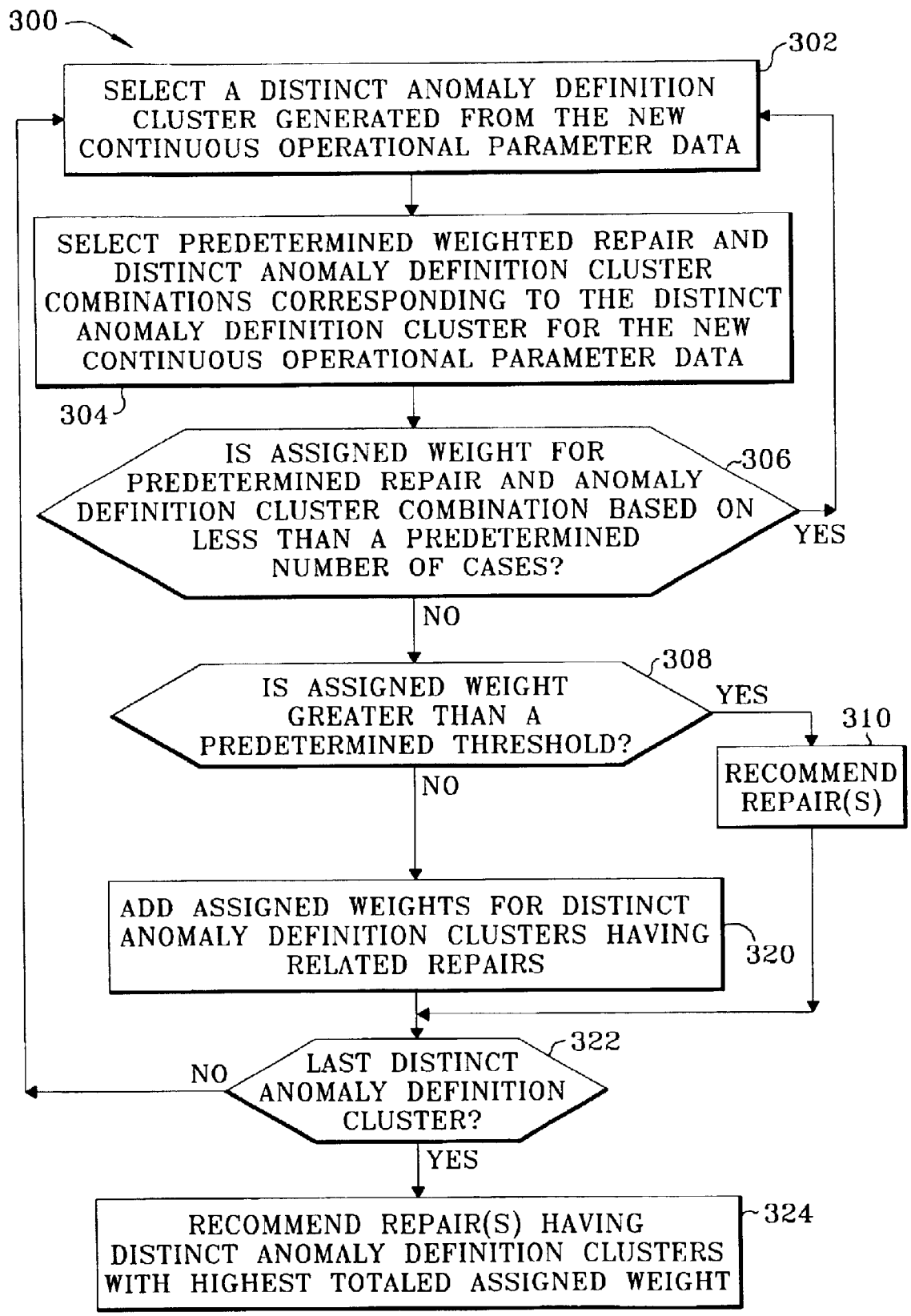
FIG. 9 is a flowchart further describing the step of predicting repairs from the weighted repair and anomaly definition cluster combinations shown in FIG. 8.

FIG. 9 is a flowchart of an exemplary process 300 for determining and presenting the top most likely repair candidates which may include repairs derived from predetermined weighted repair and distinct anomaly definition cluster combinations having the greatest assigned weighted values or repairs which are determined by adding together the assigned weighted values for anomaly definition clusters for related repairs.

As shown in FIG. 9, initially, a distinct anomaly definition cluster generated from the new continuous parameter data is selected at 302. At 304, predetermined repair(s) and assigned weight(s) corresponding to the distinct anomaly definition cluster are selected from directed weight storage unit 26 (FIG. 1).

At 306, if the assigned weight for the predetermined weighted repair and anomaly definition cluster combination is determined by a plurality of cases for related and unrelated repairs which number is less than a predetermined number, e.g., 5, the cluster is excluded and the next distinct anomaly definition cluster is selected at 302. This prevents weighted repair and anomaly definition cluster combinations that are determined from only a few cases from having the same effect in the prediction of repairs as weighted repair and anomaly definition cluster combinations determined from many cases.

If the number of cases is greater than the predetermined minimum number of cases, at 308, a determination is made as to whether the assigned value is greater than a threshold value, e.g., 0.70 or 70%. If so, the repair is displayed at 310. If the anomaly definition cluster is not the last anomaly definition cluster to be analyzed at 322, the next distinct anomaly definition cluster is selected at 302 and the process is repeated.

If the assigned weight for the predetermined weighted repair and anomaly definition cluster combination is less than the predetermined threshold value, the assigned weights for related repairs are added together at 320. Desirably, up to a maximum number of assigned weights, for example five, are used and added together. After selecting and analyzing the distinct anomaly definition clusters generated from the new continuous parameter data, the repairs having the highest added assigned weights for anomaly definition clusters for related repairs are displayed at 324.

With reference again to FIG. 8, repairs corresponding to the weighted repair and anomaly definition cluster combinations in which the assigned weights are greater than the threshold value are presented first. As shown in FIG. 8, repair codes 1766 and 1777 and distinct anomaly definition cluster combinations 7311, 728F, and 720F, have an assigned weight of 85% and indicate a recommended replacement of the EFI.

As also shown in FIG. 8, repairs for various anomaly definition clusters having the highest added or total weight are presented next. For example, repair code 1677 that corresponds to a traction problem has a totaled assigned weight of 1.031, repair code 1745 that corresponds to a locomotive software problem has a totaled assigned weight of 0.943, and repair code 2323 that corresponds to an overheated engine has a totaled assigned weight of 0.591.

Advantageously, the top five most likely repair actions are determined and presented for review by a field engineer. For example, up to five repairs having the greatest assigned weights over the threshold value are presented. When there is less than five repairs which satisfy the threshold, the remainder of recommended repairs are presented based on a total assigned weight.

Desirably the new continuous parameter data is initially compared to a prior continuous parameter data from the malfunctioning locomotive. This allows determination whether there is a change in the continuous parameter data over time. For example, if there is no change, e.g., no new anomaly definitions, then it may not be necessary to process the new continuous parameter data further.

Figure 10:
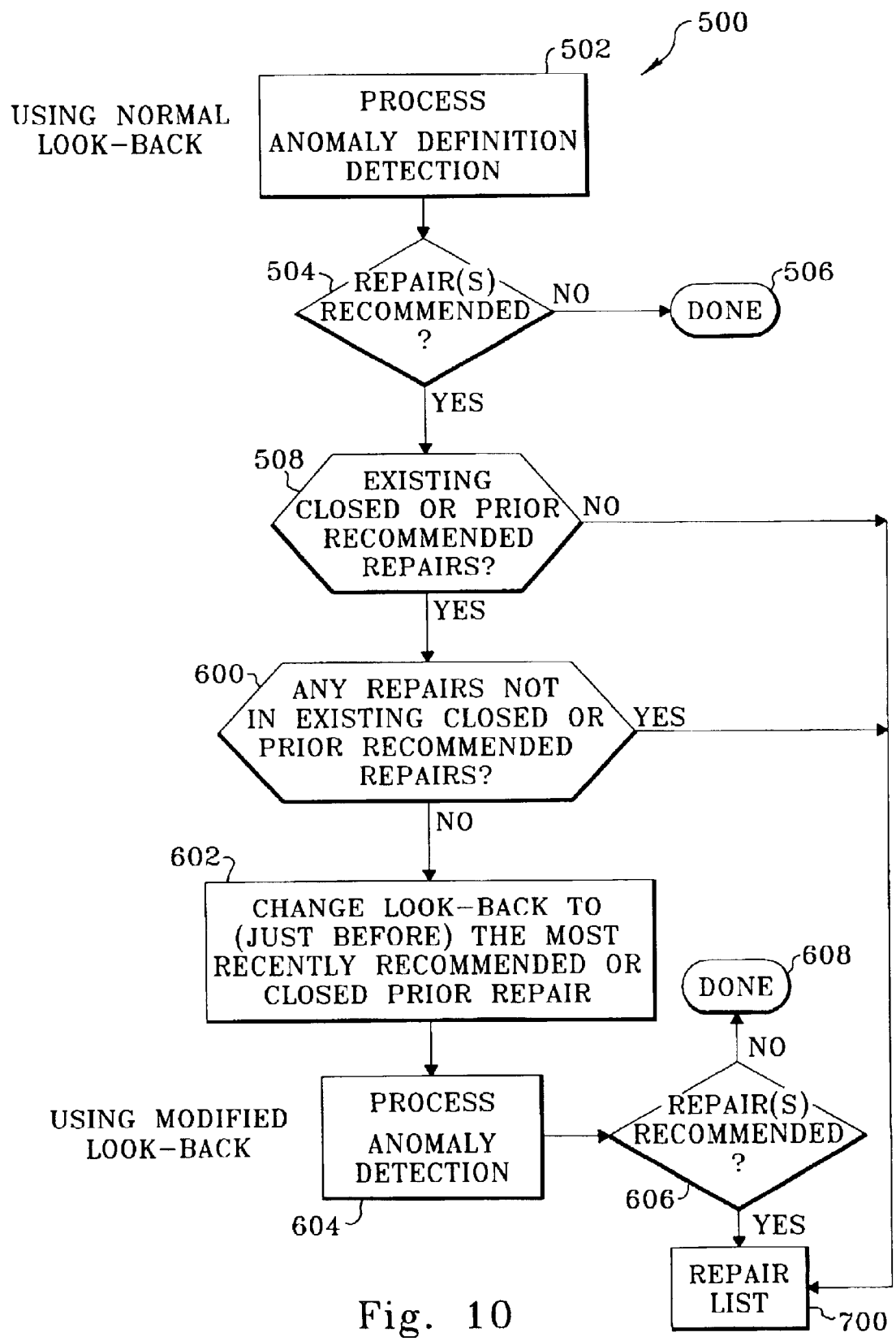
FIG. 10 is one embodiment of a flowchart describing the steps for automatically analyzing new continuous parameter data from a malfunctioning machine and predicting one or more possible repair actions.

FIG. 10 illustrates a flowchart of an exemplary automated process 500 for analyzing continuous parameter data from a locomotive, e.g., new continuous parameter data that is generated every day, using system 10. In particular, process 500 accommodates the situation where a prior repair is undertaken or a prior repair is recommended within the predetermined period of time over which the continuous parameter data is analyzed. This avoids recommending the same repair which has been previously recommended and/or repaired.

At 502, new continuous parameter data is received which includes anomaly definitions occurring over a predetermined period of time, e.g., 14 days. The continuous parameter data is analyzed, for example as described above, generating distinct anomaly definition clusters and comparing the generated anomaly definition clusters to predetermined weighted repair and anomaly definition cluster combinations.

At 504, the analysis process may use a thresholding process described above to determine whether any repairs are recommended (e.g., having a weighted value over 70%). If no repairs are recommended, the process is ended at 506. The process is desirably repeated again with a download of new continuous parameter data the next day.

If a repair recommendation is made, existing closed (e.g., performed or completed repairs) or previously recommended repairs that have occurred within the predetermined period of time are determined at 508. For example, existing closed or previously recommended repairs may be stored and retrieved from repair data storage unit 20. If there are no existing or recommended repairs than all the recommended repairs at 504 are listed in a repair list at 700.

If there are existing closed or prior recommended repairs, then at 600, any repairs not in the existing closed or prior recommended repairs are listed in the repair list at 700.

For repairs that are in the existing closed or prior recommended repairs, at 602, the look-back period (e.g., the number of days over which the anomaly definitions are chosen) is revised. Using the modified look-back or shortened period of time, the modified continuous parameter data is analyzed at 604, as described above, using distinct anomaly definition clusters, and comparing the generated anomaly definition clusters to predetermined weighted repair and anomaly definition cluster combinations.

At 606, the analysis process may use the thresholding process described above to determine whether any repairs are recommended (e.g., having a weighted value over 70%). If no repairs are recommended, the process is ended at 608 until the process is stated again with a new continuous parameter data from the next day, or if a repair is recommended it is added to the repair list at 700.

From the present description, it will be appreciated by those skilled in the art that other processes and methods, e.g., different thresholding values or continuous parameter data analysis which does not use distinct anomaly definition clusters, may be employed in predicting repairs from the new continuous parameter data according to process 500 which takes into account prior performed repairs or prior recommended repairs.

The continuous parameter data stored in continuous parameter data storage unit 22 of FIG. 1 may include data indicative of a plurality of operational parameters or operational conditions of the machine. The operational parameter data may be obtained from various sensor readings or observations, e.g. temperature sensor readings, pressure sensor readings, electrical sensor readings, engine speed readings, etc. Examples of operational conditions of a locomotive may include whether the locomotive is operating in a motoring or in a dynamic braking mode of operation, whether any given subsystem in the locomotive is undergoing a self-test, whether the locomotive is stationary, whether the engine is operating under maximum load conditions, etc. The operational parameter data storage unit 22 may contain operational parameter data for a plurality of different machines, and it may receive real-time data from one or more machines.

Figure 11:
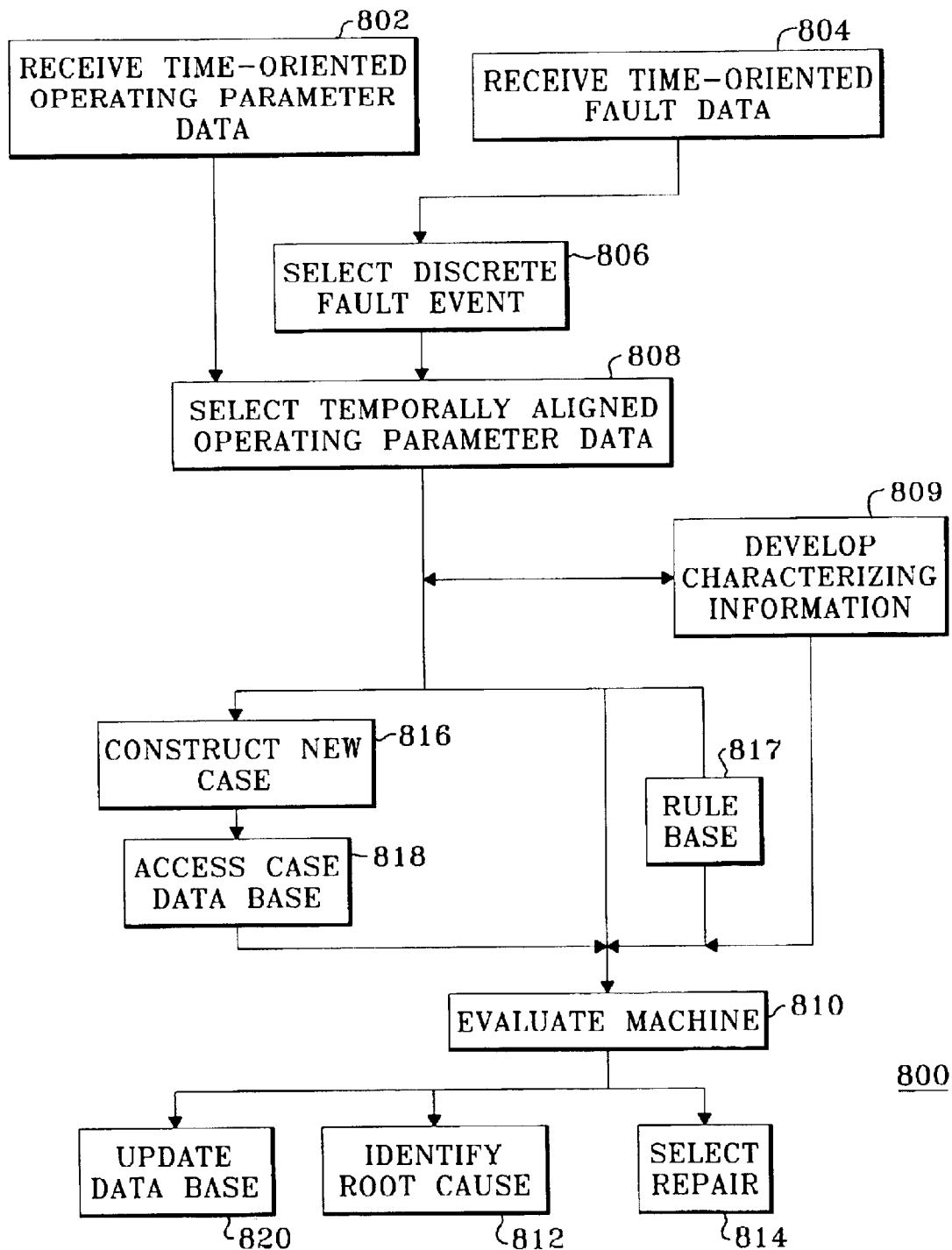
FIG. 11 is a flowchart describing a method for analyzing fault data together with sequential operational data.

FIG. 11 illustrates the steps of a method 800 for analyzing fault data together with sequential operating parameter data. Operational data may be sensed and recorded as discrete snapshot data and/or as continuous data at step 802. Sequential operating data is time-oriented so that discrete data points and intervals of data may be identified to a particular time period, for example to a standard time zone such as Eastern Standard Time or to a machine-specific time such as engine running hours. Time-oriented fault information such as fault log data is also sensed and recorded at step 804. The time orientation of the fault information and the sequential operating parameter data should be measured in a common measurement framework or should be convertible to a common framework. A particular fault event is identified for analysis at step 806. Such analysis may be conducted immediately upon receipt of the fault information or at any later point in time, and preferably in time to schedule a repair activity directed to correcting the source of the initiating fault event.

The process 800 of FIG. 11 further includes the step 808 wherein a particular subset of the sequential operating parameter data from a selectively focused time interval about the fault indication of step 804 is selected for use in the analysis of the fault event. The selected operating parameter data is a subset of the sequential operating parameter data that is temporally aligned with the fault event and that is selectively focused about the fault event. The term "selectively focused time interval" is used herein to mean operating parameter data having a sequence contained within a time period just before, around and during, and/or just after the generation or logging of the fault information. The selectively focused operational parameter data may be snapshot observations or it may be continuous observations over a predetermined period of time. The fault event data and this subset of selectively focused sequential operating parameter data are then used at step 810 to evaluate the machine. The evaluation may result in an identification of the root cause of the fault event at step 812 and/or it may result in a selection of a repair for the machine at step 814.

Various types of characterizing information may be developed at step 809 from the sequential operating parameter data over the selectively focused time interval to aid in the evaluation. Examples of such characterizing information include rate of change information (e.g. ° F./sec.), absolute sign of the data (e.g. + or −), direction of change information (e.g. increasing or decreasing), first derivative or slope information (e.g. +° F./sec.), or higher order derivative information (e.g. +° F./sec./sec.). Other examples of characterizing information may include regression analysis information, and information developed by the selective filtering of the data, such as with a high-pass filter or a low-pass filter. The operating parameter data will contain information over the selectively focused time interval that differs from the information that can be derived from a trending analysis because the selectively focused time interval data is indicative of a short term property of the operating parameter data that is sequenced with a particular fault, whereas trending data is a long term property that exists independently from any particular fault. The selectively focused time interval is chosen to provide uniquely useful information for the particular fault being evaluated. The time duration of the selectively focused time interval and its location along the time continuum relative to the fault event may vary from one application to the next, and from one fault to the next. The following are examples of ways that these process steps may be accomplished.

EXAMPLE 1

A fault indication of an excess current draw on a radiator fan motor is selected at step 806. Operational data is selected at step 808 to indicate the ground state of the auxiliary power supply that provides current to the fan motor at a time just prior to the time of the fault indication selected in step 806. Selectively focusing on the ground state just prior to the radiator fan motor current fault indication can provide information regarding the cause of the radiator fan motor problem; e.g. if the ground state is not normal, the excess current draw may be due to a grounding failure, but if the ground state is normal, the excess current draw may be due to a locked rotor or other such failure. The indication of the radiator fan motor excess current draw and the temporally aligned operating data regarding the ground state are then used together at step 810 to identify a likely cause of the radiator fan failure.

EXAMPLE 2

A fault indication of a diesel engine failure is selected at step 806. Sequential operating parameter data indicating the engine coolant temperature over a time interval shortly after the time of the logging of the fault is selected at step 808. This selectively focused subset of the temperature data gives an indication of whether the failure has progressed or whether it was caused by a transient condition. The indication of the diesel engine failure and the coolant temperature sequence after the failure indication are then used at step 810 to identify a likely cause of the failure.

EXAMPLE 3

A fault indication of an engine high temperature alarm is selected at step 806. At step 808 we selectively focus on operational data indicating the change in engine temperature over a one-minute interval just prior to the fault alarm. The sequential operational data from this selectively focused time interval provides an indication of a rate of change in temperature, i.e. a slope or first derivative of the operating parameter. Knowing such first derivative information can provide an indication of whether the fault was due to a catastrophic failure of the cooling system. The indication of high temperature and the first derivative of the temperature data are used at step 810 to identify a likely cause of the fault with a higher probability of successfully identifying the actual failure than would otherwise be possible by using just the fault indication data.

The analyses of fault log data in method 800 of FIG. 11 may further include an automated case analysis process as described above with regard to FIGS. 1–10. The fault event selected at step 806 may include distinct anomaly clusters that may be paired with sequential operating parameter data from a selectively focused time interval about the fault to define a new case at step 816. A library of case data stored in case database 24 of FIG. 1 may be accessed at step 818. The step 810 of evaluating the machine may include a comparison of the new case to known cases in the case database 24. Upon completion of the evaluation and identification of the root cause 812 and/or selection of a repair activity 814, the case database 24 may be updated with the newly developed case information at step 820.

Further, the fault log data may be processed with rule-based diagnostics, as shown at step 817. Once the discrete fault event is obtained at step 806 and the subset of the sequential operating parameter data is selected at step 808, a set of pre-established rules may be applied to facilitate the evaluation of the machine.

Figure 12:
FIG. 12 is a display of faults illustrating normal and extended data packs associated with the respective faults.

FIG. 12 is a display 822 of a set of defined faults 824 for a locomotive and the associated temporally aligned sequential operating parameter data that may be used in evaluating the respective fault. The faults are identified by a coding system; for example, fault $F01_{-2}$ may be a radiator fan motor high current alarm. The operating parameter data 826 that may be available are listed along the top of the display. These parameters include engine water temperature (EWT), lube oil temperature (LOT), horsepower (HP), speed sensor #1 (SS#1), battery voltage (BATT V), auxiliary generator voltage (AUX V), auxiliary generator current (AUX I) and radiator fan panel current (RFP I). The operating parameter data to be used for evaluating a respective fault are predefined as indicated in the display 822, with both a normal data pack and an extended data pack being available, depending upon the requirements of a particular application. The association of such a selectively focused subset of the sequential operating parameter data with respective faults may be developed through the evaluation of empirical information such as historical and test data, and/or it may be developed through an understanding of the design of the machine and modeling techniques. The improved method of the present invention utilizes a subset of the sequential operating parameter data such as the temporally aligned extended data pack associated with fault $F01_{-2}$ to facilitate the determination of the root cause of the fault and/or to select a repair for correcting the problem.

The type of sequential operating parameter data and the selectively focused time interval of that data that are utilized to evaluate a fault indication may vary from one fault to another, and from one application to another. Generally, it is useful to selectively focus upon data that occurs within seconds before and/or after the logging of the fault event. In various embodiments, sequential data may be used that is time-displaced by 1 second or less, by 5 seconds or less, by 30 seconds or less, by 1 minute or less, or by 5 minutes or less. The time-orientation of the selectively focused data may be adjusted for a particular application. Certain fault/sequential data combinations will involve only operating parameter data that is time-displaced prior to the fault, others will involve only operating parameter data that is time-displaced after the fault, and others will involve operating parameter data from a time period spanning the time of the fault, or any combination of these. Each of these examples is included within the term "selectively focused" operating data.

Figure 13:
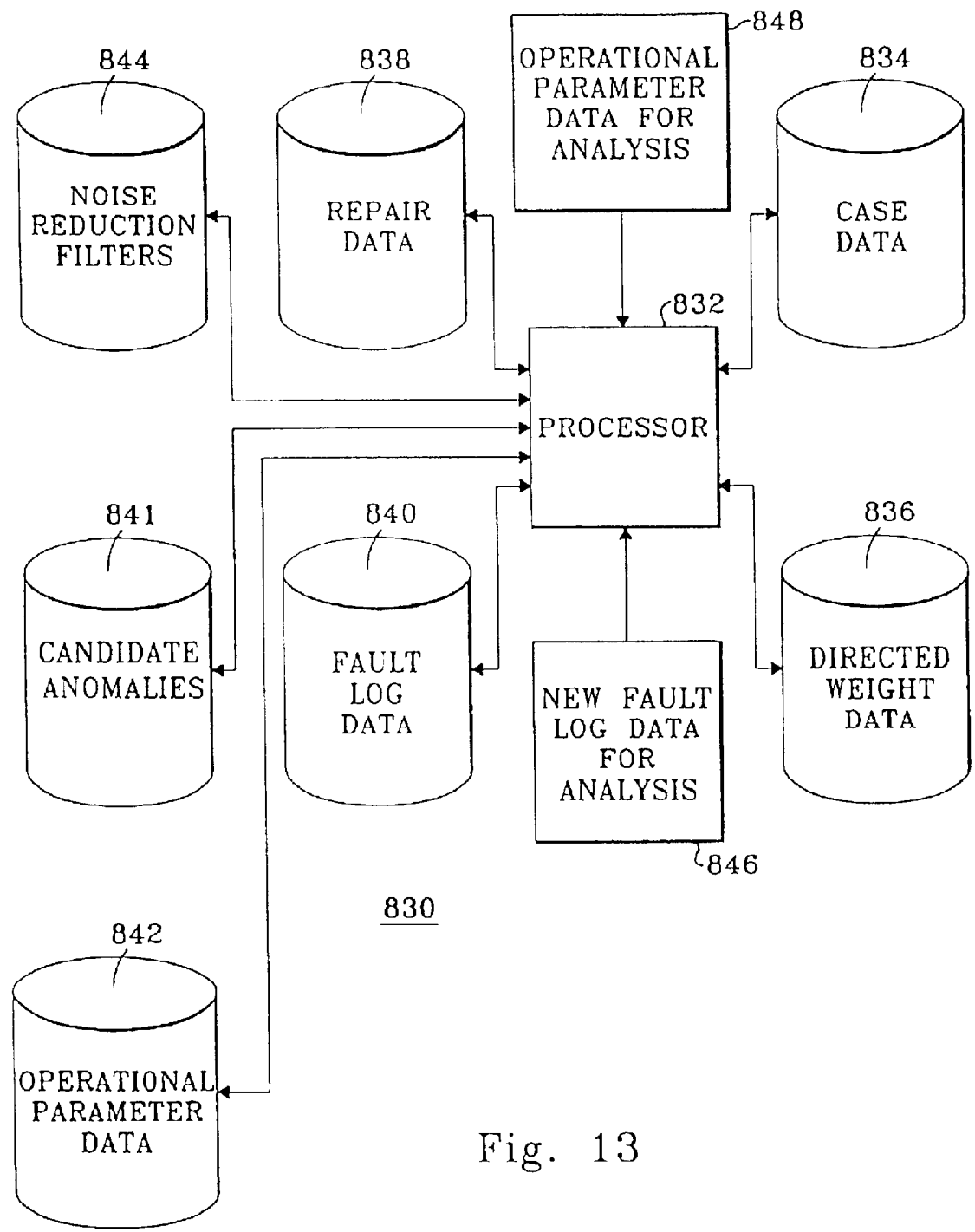
FIG. 13 is a block diagram of a system that uses a processor for processing operational parameter data and fault log data from one or more machines for diagnosing a malfunctioning machine.

The method 800 of FIG. 11 may be implemented by a computerized apparatus such as system 830 of FIG. 13 that includes appropriate programmed instructions for execution by processor 832. Such programmed instructions may take any form known in the art of computer programming to execute the steps of the methods described herein. Processor 832 has access to a case data storage unit 834, a directed weight storage unit 836, a repair data storage unit 838, a fault log storage unit 840, a candidate anomaly storage unit 841, and an operational parameter data storage unit 842. Noise reduction filters 844 may be incorporated into the system 830 to improve the efficiency of the process 800. Such noise filters may be, for example, ignoring any fault generated by a system that is in a self-test mode, ignoring the second of two faults received within a predetermined time period, etc. New fault log data 846 and new operational parameter data 848 are received by processor 832 for analysis, either in real time or on a time-delayed basis.

FIG. 14 (draw on two sheets as FIGS. 14A and 14B) shows an exemplary data file 850 that combines fault log data and sequential operational parameter data 852, such as locomotive speed, engine water temperature, engine oil temperature, call status, etc. FIG. 14 further illustrates exemplary candidate snapshot anomalies and noise reduction filters that may be used to enhance the predictive accuracy of the algorithms of the present invention. One example of such a noise reduction filter is detection of a predetermined code, e.g. the letter S adjacent to bracket 854 in the column designated "call". In this case, this noise reduction filter allows for ignoring any faults that may have been logged while a self-test is being conducted. Another example of a noise reduction filter may be based on ignoring suspect or unreliable information, such as may occur upon detection of two or more consecutive faults within a predetermined period of time. For example, as illustrated in bracketed row 856, this noise reduction rule allows the system to ignore the observations of operational parameters 852 whenever any fault is logged within a predetermined period of time, e.g. $t_1$ ms, of any previously logged fault. Similarly, as illustrated in bracketed row 858, another example of a noise reduction filter would allow for ignoring operating parameter observations if any fault is logged within a predetermined period of time, e.g. $t_2$ ms, of any two previously logged faults.

The present invention allows for using a set of candidate anomalies stored in candidate anomaly storage unit 841 to process the fault log data and the sequential operating parameter data. As used herein, candidate anomalies refer to one or more conditions that may be triggered based upon deviations in the operational parameter data and/or the fault log data. One example of a candidate anomaly that uses selectively focused sequential operating parameter data is illustrated in the data field entry adjacent to bracket 860. In this case, the candidate anomaly would be triggered if the engine water temperature exceeds the engine oil temperature by a predetermined temperature, e.g. $T_1$ degrees C., and if the water temperature is above another predetermined temperature, e.g. $T_2$ degrees C. Upon such conditions being met by the respective operating parameters, then this exemplary candidate anomaly would be triggered and would allow for declaring a cooling subsystem malfunction with a higher level of confidence than would otherwise be feasible if one were to rely on fault log data alone. It will be appreciated that using the foregoing candidate anomaly in combination with detection of one or more faults regarding the cooling subsystem will increase the probability that in fact there is a malfunction of the cooling subsystem as compared to detection of cooling subsystem faults by themselves. Another example of a candidate anomaly is illustrated by the data field entry adjacent to bracket 862. In this case, the candidate anomaly would be triggered when the oil engine temperature exceeds the engine water temperature by a predetermined temperature, e.g., $T_1$ degrees C., and if the oil temperature is above another predetermined temperature, e.g., $T_2$ degrees C. Upon being triggered, this other exemplary candidate anomaly would allow for declaring a malfunction in the lubrication subsystem of the engine with a higher level of confidence than would otherwise be possible. The foregoing candidate anomaly in combination with detection of one or more faults regarding the lubrication subsystem will increase the probability that in fact there is a malfunction of the lubrication subsystem as compared to detection of lubrication subsystem faults by themselves. The construction of noise reduction filters and/or candidate anomalies may involve searching for combinations of clusters or groups of faults as well as searching for respective combinations of observations of multiple operational parameters.

The present invention is useful for diagnosing an intermittent fault indication in a mobile vehicle such as a locomotive or truck. When a component of a mobile vehicle fails and remains in a failed state, the diagnosis of the failure is made easier by the fact that the malfunction exists when the vehicle returns to a service center for periodic maintenance. A service technician may find such a failure by simply operating the system of the vehicle containing the failed component or by placing the system is a test mode and observing the malfunction. However, when a component or system exhibits intermittent or transient conditions that trigger a fault indication that then clears itself, it is often difficult for the service center technician to replicate the condition of the fault when the vehicle returns to the service location. This is particularly true when the fault indication is associated with a transient condition that may not be easily reproduced at the service location. The present system and method allow for the recording of a full range of operating parameter data over time as the vehicle is operating. Fault log data is also recorded. Upon arrival of the vehicle at a service location, or earlier via remote data download, the service technician receives the time-oriented fault data 804 and the time-oriented operating parameter data 802 and selects a discrete fault event 806 for evaluation. An associated subset of the operating parameter data from a selectively focused time interval may be selected at step 808 for use during the evaluation of the fault indication 810. Characterizing information may be developed 809 over the selectively focused time interval to aid in the identification of short-term operating conditions associated with the fault indication. In this manner, the true cause of a transient fault indication may be diagnosed with a higher probability of a correct diagnosis than with prior art diagnostic techniques that do not utilize such selectively focused operating parameter data.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

We claim as our invention:

1. A computer implemented method for diagnosing a malfunction of a machine, the method comprising:
   receiving sequential operating parameter data from a machine;
   receiving a fault indication from the machine;
   selecting sequential operating parameter data from a selectively focused time interval about the fault indication;
   developing characterizing information from the sequential operaating paramerer data over the selectively focused time interval; and
   using the characterizing information and the fault indication to diagnose a malfunction of the machine.

2. The method of claim 1, further comprising:
   using the selected sequential operating parameter data and the fault indication to construct a new case; and
   comparing the new case to known cases in a case database to diagnose a malfunction of the machine.

3. The method of claim 1, further comprising applying the selected sequential operating parameter data and the fault indication to a rule base to diagnose a malfunction of the machine.

4. The method of claim 1, further comprising selecting sequential operating parameter data from a time interval sequentially prior to the fault indication.

5. The method of claim 1, further comprising selecting the sequential operating parameter data from a time interval sequentially after the fault indication.

6. The method of claim 1, further comprising:
   developing rate of change information from the selected sequential operating parameter data; and
   using the rate of change information and the fault indication to diagnose a malfunction of the machine.

7. The method of claim 1, further comprising:
   developing absolute sign information from the selected sequential operating parameter data; and
   using the absolute sign information and the fault indication to diagnose a malfunction of the machine.

8. The method of claim 1, further comprising:
   developing direction of change information from the selected sequential operating parameter data; and
   using the direction of change information and the fault indication to diagnose a malfunction of the machine.

9. The method of claim 1, further comprising:
   developing slope information from the selected sequential operating parameter data; and
   using the slope information and the fault indication to diagnose a malfunction of the machine.

10. The method of claim 1, further comprising developing the characterizing information to include one of the group of rate of change information, absolute sign information, direction of change information, slope information, derivative information, regression analysis information, high-pass filter information an low-pass filter information.

11. A computer implemented method of dignosing a malfunction of a mobile vehicle, the method comprising:
    recording sequential operating parameter data from the vehicle;
    receiving a fault indication from the vehicle;
    selecting sequential operating parameter data from a selectively focused time interval about the fault indication;
    developing characterizing information from the selected sequential operating parameter data over the selectively focused time interval; and
    using characterizing information and the fault indication to diagnose a malfunction of the vehicle.

12. The method of claim 11, further comprising:
    using the selected sequential operating parameter data and the fault indication to construct a new case; and
    comparing the new case to known cases in a case database to diagnose a malfunction of the vehicle.

13. The method of claim 11, further comprising applying the selected sequential operating parameter data and the fault indication to a rule base to diagnose a malfunction of the vehicle.

14. The method of claim 11, further comprising:
    developing rate of change information from the selected sequential operating parameter data; and
    using the rate of change information and the fault indication to diagnose a malfunction of the vehicle.

15. The method of claim 11, further comprising:
    developing absolute sign information from the selected sequential operating parameter data; and
    using the absolute sign information and the fault indication to diagnose a malfunction of the vehicle.

16. The method of claim 11, further comprising:
    developing direction of change information from the selected sequential operating parameter data; and using the direction of change information and the fault indication to diagnose a malfunction of the vehicle.

17. The method of claim 11, further comprising:

developing slope information from the selected sequential operating parameter data; and using the slope information and the fault indication to diagnose a malfunction of the vehicle.

18. The method of claim 11, further comprising developing the characterizing information to include one of the group of rate of change information, absolute sign information, direction of change information, slope information, derivative information, regression analysis information, high-pass filter information and low-pass filter information.

19. The method of claim 11, wherein the selectively focused time interval consists of a time period just before the fault indication.

20. The method of claim 11, wherein the selectively focused time interval consists of a time period just after the fault indication.

21. The method of claim 11, further comprising applying a filter to ignore predetermined fault indications.

22. The method of claim 11, further comprising using a regression analysis to develop the characterizing information.

23. An apparatus for diagnosing a malfunction of a machine, the apparatus comprising:

an operating parameter database containing sequential operating parameter data from a machine;

a fault log database containing fault log data from the machine;

a processor connected to the operating parameter database and the fault log database;

programed instructions executable by the processor to select a fault event;

programmed instructions executable by the processor to select sequential operating; parameter data from a selectively focused time interval about the fault event;

programmed instructions executable by the processor to develop characterizing information from the selected sequential operating parameter data over the selectively focused time interval; and programmed instructions executable by the processor to use the characterizing information and the fault event to diagnose a malfunction of the machine.

\* \* \* \* \*